C. J. KRUSE.
MOTOR CONTROLLER.
APPLICATION FILED JAN. 5, 1911.
1,128,692.
Patented Feb. 16, 1915.
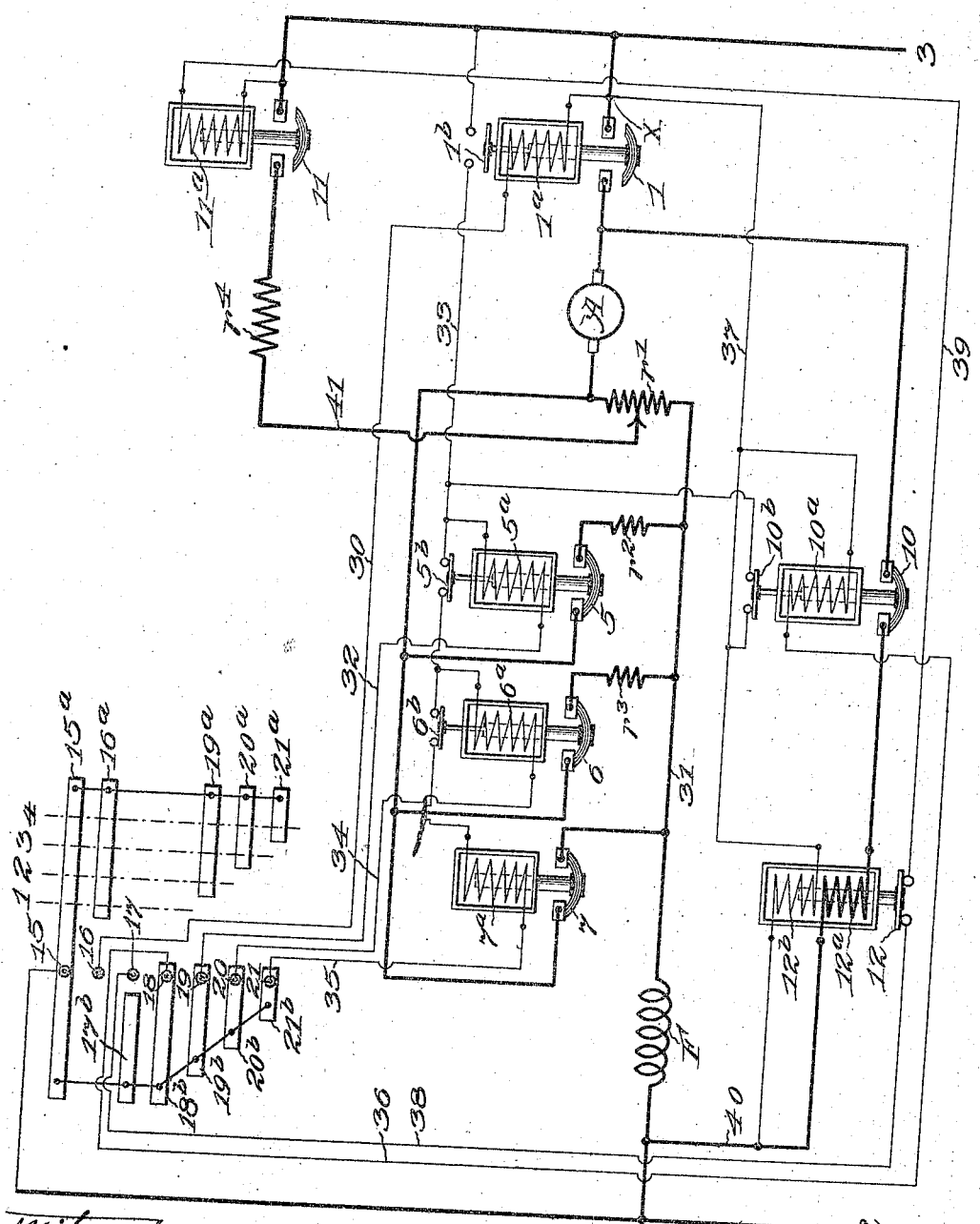
Witnesses:
Geo. Haynes
M S Osborn
Inventor
Charles J. Kruse.
By Edwin B. H. Tower, Jr. Atty.

UNITED STATES PATENT OFFICE.

CHARLES J. KRUSE, OF CLEVELAND, OHIO, ASSIGNOR TO THE CUTLER-HAMMER MFG. CO., OF MILWAUKEE, WISCONSIN, A CORPORATION OF WISCONSIN.

MOTOR-CONTROLLER.

1,128,692.

Specification of Letters Patent. Patented Feb. 16, 1915.

Application filed January 5, 1911. Serial No. 600,858.

*To all whom it may concern:*

Be it known that I, CHARLES J. KRUSE, a citizen of the United States, residing at Cleveland, in the county of Cuyahoga and State of Ohio, have invented new and useful Improvements in Motor-Controllers, of which the following is a full, clear, concise, and exact description, reference being had to the accompanying drawing, forming a part of this specification.

My invention relates to improvements in motor controllers.

It is one object of my invention to provide a controller wherein, if the motor is connected to a supply source, after a dynamic braking circuit has been established therefor, the motor will be automatically disconnected from the supply source upon a reversal of current in the dynamic braking circuit due to the motor acting as a generator.

A further object of my invention is to provide a controller by means of which the series field of a motor may be separately excited and the operation of the motor reversed for giving a kick-off to its load, and which will facilitate regulation of the motor to give the desired kick-off.

Various other objects and advantages of my invention will be hereinafter clearly and fully set forth.

In order to more fully and clearly disclose the nature and advantages of my invention, I shall describe the embodiment thereof diagrammatically illustrated in the accompanying drawing. It should be understood, however, that my invention is not limited to the particular controller illustrated, but is susceptible of various modifications.

For the purpose of illustration, I have shown my invention as applied to the control of a series motor having an armature A and a series field winding F. It may be assumed that the motor is employed for operating some form of hoist. For controlling the continuity of the motor circuit to cause the same to operate to raise its load, I have provided a main switch 1 having an operating winding $1^a$. This switch is adapted to connect the motor across supply lines 2 and 3. In practice, any preferred means may be employed for accelerating the motor. As illustrated, I have provided parallel starting resistances $r^1$, $r^2$ and $r^3$. These resistances are adapted to be successively connected in parallel by switches 5, 6 and then short circuited by switch 7. The switches 5, 6 and 7 are provided with operating windings $5^a$, $6^a$ and $7^a$ respectively. The accelerating switches 5 and 6 are provided with auxiliary switches $5^b$ and $6^b$ for insuring successive operation of the switches 5, 6 and 7. The main switch 1 has an auxiliary switch $1^b$ forming an interlock between said main switch and the accelerating switches to necessitate operation of the former prior to operation of any of the latter. To start the motor to raise its load, it is only necessary to energize the main switch 1 to close the motor circuit and then successively energize switches 5, 6 and 7 to bring the motor up to normal speed.

It frequently happens that the load will descend of its own weight without requiring reversal of the motor. Of course, in practice a mechanical brake would be employed for holding the load in raised position. Any preferred form of mechanical brake might be employed. If the load is sufficient to descend of its own weight, then means must be provided for checking the speed of its descent. Such a check on the speed may be obtained by dynamic braking. To provide for this dynamic braking, I have illustrated a switch 10, having an operating winding $10^a$ and adapted to establish a closed loop including the motor armature and series field. Of course, the dynamic braking current generated by the motor when overhauled by its load is dependent upon the field excitation of the motor. With the motor disconnected from circuit, the series field winding F is substantially demagnetized and accordingly, if the load was allowed to descend, driving the motor as a generator, under these conditions very little dynamic braking current would be generated until the motor, acting as a generator, had picked up its voltage on the residual magnetism of the fields, and this residual magnetism is very uncertain and not to be depended upon. Of course, as the mechanical operation of the motor continues, the current generated thereby, even though small, might gradually build up the strength of the series field, which in turn would re-act to increase the dynamic braking current. While sufficient dynamic current might be finally generated to check the descent of the load before it reached the limit of its travel, yet the load would drop very quickly at the start, which is an objectionable feature. To meet this contingency, I have provided a switch 11 having an operating winding $11^a$, which switch is adapted to separately excite the series field winding to enable the motor when acting as a dynamic brake to generate a strong braking current from the start. In order to regulate the dynamic braking effect of the motor, I have arranged the starting resistance $r^3$, $r^2$ and $r^1$ in such a manner that they may be inserted, or removed from the braking circuit at will with the results hereinafter set forth. The switch 11 is adapted to connect an intermediate point of the resistance $r^1$ to main line 3 through a suitable resistance $r^4$. As will be hereinafter more clearly set forth, closure of the switch 11 not only separately excites the series winding, but also reverses the flow of current through the armature, the flow of current through the series field remaining the same as when a motor is controlled by the main switch 1. Accordingly, if upon release of the mechanical brake, the load does not descend of its own weight then closure of the switch 11 will cause the motor to operate in a reverse direction giving the load an impulse, or "kick-off" in the downward direction. After the load has been given its initial impulse in the downward direction it may then be capable of continuing its descent under its own weight. Owing to the insertion of the resistance $r^4$, in the motor circuit, when the motor is reversed it will operate only at a slow speed. Accordingly, if the load be sufficient to continue its descent under its own weight, then it will quickly overhaul the motor to mechanically drive the same as a generator. Under these conditions the field winding will be fully energized and accordingly the motor will at once generate a strong braking current; which is capable of maintaining the field winding sufficiently energized for dynamic braking purposes without requiring separate excitation thereof. To terminate the separate excitation of the series field under the conditions just set forth, I provide a switch 12, adapted when operated, to de-energize the winding of switch 11. Switch 12 is provided with two windings $12^a$ and $12^b$, the former being connected in series in the dynamic braking circuit, and the latter being independently energized.

For controlling the various electroresponsive switches, I have diagrammatically illustrated a master switch including a series of contact fingers 15, 16, 17, 18, 19, 20 and 21. Arranged on the right hand side thereof and adapted to engage the same are segments $15^a$, $16^a$, $19^a$, $20^a$ and $21^a$, all electrically connected. On the left hand side are a series of segments $17^b$, $18^b$, $19^b$, $20^b$ and $21^b$, all electrically connected together, and also connected to a segment $15^a$, which remains in continuous engagement with contact finger 15. Contact finger 15 is electrically connected to supply line 2. Contact finger 16 is connected to the operating winding of the main switch 1. Contact finger 17 is connected through switch 12 to the operating winding of switch 11. Contact finger 18 is connected to the operating winding of dynamic braking switch 10. Contact fingers 19, 20 and 21 are connected to the operating windings of accelerating switches 5, 6 and 7 respectively.

I shall now describe the operation and functions of the controller, at the same time more clearly setting forth the circuit connections therefor. To start the motor to raise the load, the controller should be moved to bring the right hand set of contact segments into engagement with the contact fingers.

In position 1, of the controller, when moved in this direction circuit is completed from main line 2 to contact finger 15 by segments $15^a$ and $16^a$ to finger 16 by conductor 30 through the operating winding of main switch 1 to main line 3. Switch 1 thereupon responds completing a circuit from main line 2 through the series field winding F by conductor 31 through the starting resistance $r^1$, the motor armature and main switch 1 to supply line 3. The motor is thus set in operation.

In position 2 of the master controller, circuit is completed from contact finger 15 by contact segments $15^a$ and $19^a$ to contact finger 19 by conductor 32 through the operating winding of switch 5 by conductor 33 through the auxiliary switch $1^b$ of main switch 1 to supply line 3. Thereupon switch 5 closes connecting the resistance $r^2$ in the motor circuit in parallel with the resistance $r^1$.

In position 3 of the master controller, circuit is closed from contact finger 15 to contact finger 20 by conductor 34 through the operating winding of switch 6 and auxiliary switch $5^b$ of switch 5 to conductor 33. The switch 6 thereupon responds connecting the resistance $r^3$ in a motor circuit in parallel with resistances $r^2$ and $r^1$.

In position 4 of the master controller, circuit is closed from segment $15^a$ to contact finger 21 by conductor 35 through the operating winding of switch 7 and the auxiliary switches of accelerating switches 6 and 5 to conductor 33. Switch 7 thereupon responds short circuiting the resistances $r^3$, $r^2$ and $r^1$ causing full line potential to be impressed upon the motor to bring the same to normal speed.

Upon return of the master controller to off position, all of the switches for starting and accelerating the motor will be deënergized. The master switch is illustrated as being in off position and in this position segments $18^b$, $19^b$, $20^b$ and $21^b$ engage fingers 18, 19, 20 and 21 respectively. This results in completing a circuit from segment $15^a$ to segment $18^b$ and contact finger 18 by conductor 36 through the operating winding of switch 10 by conductor 37 to supply line 3. Switch 10 thereupon responds establishing a closed loop including the motor armature, series field winding and resistance $r^1$. Also in responding it closes to auxiliary switch $10^b$ which connects the operating windings of switches 5, 6 and 7 to conductor 37 and main line 3 causing said switches to again respond.

It will be assumed that, in bringing the master controller back to off position, some form of mechanical brake has been applied and, that the same will not be released until the master controller has been moved into its first lowering position. In the first lowering position of the master controller, segment $17^b$ thereof engages contact finger 17 completing a circuit from said contact finger by conductor 38 through the switch 12 by conductor 39 through the operating winding of switch 11 to main line 3. Thereupon switch 11 responds. This completes a circuit through the motor armature from supply line 2 by conductor 40 through coil $12^a$ of switch 12 thence through the motor armature and a portion of the resistance $r^1$ by conductor 41 through the resistance $r^4$ and switch 11 to main line 3. It will thus be seen that the flow of current through the motor armature is now in an opposite direction to that previously set forth. Circuit is also closed from supply line 2 through the series field winding by conductor 31 through a portion of the resistance $r^1$ by conductor 41 and thence to main line 3. The flow of current through the series field winding is in the same direction as that previously set forth and accordingly with the circuit connections just described the motor will operate in reverse direction. Accordingly, upon release of the mechanical brake, the load fails to descend of its own weight then the motor will give it an initial impulse, or "kick-off". In practice it is desirable to adjust the speed of the motor for "kick-off" purposes in accordance with the particular conditions to be met. The speed of the motor for "kick-off" may, of course, be regulated to some extent by adjustment of resistance $r^4$. The resistance $r^1$, however, owing to its location enables a much finer speed adjustment for "kick-off" purposes. It will readily be appreciated by those skilled in the art, that the speed of the motor may be increased, or decreased as desired by merely shifting the connection between the lead 41 and the resistance $r^1$ in one direction, or the other, in accordance with result sought to be obtained.

I shall now explain the operation of the switch 12. The circuit of the winding $12^b$ of said switch extends from conductor 40 to conductor 37 and hence is per directly to conductor 37 and hence is permanently connected across the supply lines. The energizing current of said winding $12^b$ will accordingly always flow in the same direction, to-wit, from left to right, assuming the line 2 to be positive. When the dynamic braking circuit is completed and the switch 11 is closed current will also flow from left to right through the winding $12^a$, as has already been explained. The windings $12^a$ and $12^b$ are arranged to act differentially when the flow of current therethrough is in the same direction. Accordingly when the dynamic braking circuit is completed and the switch 11 is closed, the windings $12^a$ and $12^b$ will tend to neutralize one another having no effect upon the switch 12. When, however, the motor is overhauled by its load and is operated as a generator, it will send a dynamic braking current from the right hand terminal of its armature through the switch 10 through the winding $12^a$ of switch 12 by conductor 40 through its series field winding F and through resistance $r^1$ to the left hand terminal of the armature. Under these conditions it will be seen that the flow of current through winding $12^a$ is in a reverse direction to that previously set forth. Upon such reversal of current through the winding $12^a$, said winding will act cumulatively with the winding $12^b$ to open the switch 12. Opening of the switch 12 obviously interrupts the circuit of the operating winding of switch 11 causing said switch to open and disconnect the motor from the supply lines. Thereafter the motor will continue to act as a generator sending a braking current through the loop just described. So long as the motor continues to act as a dynamic brake, the switch 12 will remain open. On the other hand the windings $12^a$ and $12^b$ are so designed that upon deënergization of the winding $12^a$ switch 12 will return to closed position.

Having thus described my invention what I claim as new and desire to secure by Letters Patent, is:

1. In combination, an electric motor, a closed loop including the armature of said motor, said loop having line connections, and means responsive to the current in said loop when the motor acts as a generator, to effect interruption of the line connections of said loop.

2. In combination, an electric motor having a series field winding, a closed loop including the armature and series field winding of said motor, said loop having line connections, and means responsive to the current in said loop when said motor acts as a generator, to effect interruption of the line connections of said loop.

3. In a motor controller, in combination, means for establishing a closed loop to include the motor armature and to connect said loop to a source of supply, and electro-responsive means responsive to the current in said loop but only when flowing therethrough in a predetermined direction to effect disconnection of said loop from the supply source.

4. In a motor controller, in combination, means for establishing a closed loop to include the motor armature and to connect said loop to a source of supply, and electro-responsive means responsive to effect disconnection of said loop from the source of supply, said electro-responsive means having two control windings acting differentially or cumulatively in accordance with the direction of flow of current through said loop.

5. The combination with an electric motor, of a closed loop including the armature of said motor and connected to a supply source, and electro-responsive means responsive to effect disconnection of said loop from the supply source, said means having two windings one connected in said loop and the other independently energized whereby said windings act differentially until the motor acts as a generator to reverse the flow of current through said loop and then act cumulatively to cause response of said means.

6. The combination with an electric motor, of a closed loop including the armature of said motor, means for connecting said loop to a supply source, and means governing said former means to automatically disconnect said loop from the supply source when said motor acts as a generator.

7. The combination with an electric motor, of means for establishing a closed loop including the armature of said motor, means for connecting said loop to a supply source, and electro-responsive means responsive to cause said second mentioned means to disconnect said loop from circuit, said electro-responsive means being inert while said motor operates upon power from the supply source and being rendered responsive by action of said motor as a generator.

8. The combination with an electric motor having a series field winding, of means for connecting the armature and series field winding of said motor in parallel to the supply source, and means responsive to effect disconnection of said motor from the supply source when said motor acts as a generator, said last mentioned means being inert while the motor operates upon power from the supply source.

9. The combination with an electric motor having a series field winding, of means for establishing a closed loop including the armature and series field winding of said motor, an electro-responsive switch for connecting said loop to a source of supply to separately excite said motor elements, and a control switch for said former switch having a winding connected in said loop and another separately excited winding, said windings acting differentially when the motor operates on power from said source, and acting cumulatively when the motor generates current.

10. The combination with an electric motor having a series field winding, of means for establishing a closed loop including the armature and series field winding of said motor and for connecting said loop to a source of supply to separately excite said motor elements, and means for regulating the relative potentials impressed upon the armature and field branches of said loop without variation of the impressed potential at the terminals of said loop or the resistance of said loop.

11. The combination with an electric motor having a series field winding, of a closed loop including the armature and series field winding of said motor, said loop being connected to a source of supply to parallel said motor elements and means for regulating the relative potentials impressed upon the armature and field branches of said loop including a fixed resistance in said loop.

12. In a motor controller, in combination, means for establishing a closed loop to include the armature and series field winding of the motor, line connections for said loop dividing the same into parallel branches and a fixed amount of resistance in said loop adjustable with respect to the parallel branches of said loop to vary the relative potentials thereof.

13. The combination with an electric motor having a series field winding, of a resistance, means for establishing a closed loop including the armature and series field winding of said motor and said resistance, and means for establishing power connections for said loop to separately excite said motor elements, including an adjustable connection between one supply line and said resistance to divide said resistance between the two branches of said loop in varying proportions.

14. The combination with an electric motor having a series field winding, of a fixed resistance, means for connecting the armature and series field winding of said motor and also said resistance in a closed loop and to a source of supply to separately excite said motor elements and an adjustable connection between said resistance and one of the supply connections to adjust said resistance relative to the branches of said loop without variation of said resistance.

15. The combination with an electric motor, of power connections and slow-down connections therefor, and means automatically interrupting said power connections when said motor acts as a generator.

16. The combination with an electric motor, of power connections and slow-down connections for said motor, and means tending to maintain said power connection but responsive to the current delivered by said motor when acting as a generator, for interrupting said power connections.

17. The combination with an electric motor having a series field winding, of a resistance, means for connecting the armature and series field winding of said motor in a closed loop with said resistance connected between the same, power connections for said loop including an adjustable connection between one power line and an intermediate point on said resistance, and means for automatically breaking the power connections upon action of said motor as a generator.

In witness whereof, I have hereunto subscribed my name in the presence of two witnesses.

CHARLES J. KRUSE.

Witnesses:
LOUISE SCHEEDEGGER,
CHARLES F. MORGAN.